(12) United States Patent
Honda

(10) Patent No.: US 6,671,566 B2
(45) Date of Patent: Dec. 30, 2003

(54) PROCESS CONTROL SYSTEM AND PROCESS CONTROL PROGRAM STORAGE MEDIUM

(75) Inventor: Hachiro Honda, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 371 days.

(21) Appl. No.: 09/906,082

(22) Filed: Jul. 17, 2001

(65) Prior Publication Data

US 2002/0022900 A1 Feb. 21, 2002

(30) Foreign Application Priority Data

Jul. 25, 2000 (JP) ........................................ 2000-223982

(51) Int. Cl.[7] .............................................. G05B 15/00
(52) U.S. Cl. ............................. 700/83; 700/97; 345/965
(58) Field of Search ............................. 700/83, 17, 96, 700/97, 99, 100, 112; 345/964, 965, 967, 970

(56) References Cited

U.S. PATENT DOCUMENTS

| 4,873,623 | A | * | 10/1989 | Lane et al. ................... 700/83 |
|---|---|---|---|---|
| 5,367,624 | A | * | 11/1994 | Cooper ....................... 345/734 |
| 5,576,946 | A | * | 11/1996 | Bender et al. ................. 700/17 |
| 5,591,299 | A | * | 1/1997 | Seaton et al. ................ 700/121 |
| 5,596,704 | A | * | 1/1997 | Geddes et al. ............... 345/967 |
| 5,623,592 | A | * | 4/1997 | Carlson et al. .............. 345/967 |
| 5,740,053 | A | * | 4/1998 | Iwama ....................... 700/121 |
| 5,740,429 | A | * | 4/1998 | Wang et al. ................. 702/185 |
| 5,854,749 | A | * | 12/1998 | Kellams et al. ............. 700/146 |
| 5,923,552 | A | * | 7/1999 | Brown et al. ............... 700/100 |
| 5,943,236 | A | * | 8/1999 | Ohno et al. ................. 700/108 |
| 5,943,484 | A | * | 8/1999 | Milne et al. ................ 700/100 |
| 6,000,830 | A | * | 12/1999 | Asano et al. ................ 700/121 |
| 6,078,320 | A | * | 6/2000 | Dove et al. ................. 345/967 |
| 6,128,588 | A | * | 10/2000 | Chacon ......................... 703/6 |
| 6,236,399 | B1 | * | 5/2001 | Nishiyama et al. ......... 345/965 |
| 6,463,350 | B2 | * | 10/2002 | Fukuda et al. .............. 700/121 |

FOREIGN PATENT DOCUMENTS

| JP | 9-22433 | 1/1997 |
|---|---|---|
| JP | 9-81637 | 3/1997 |
| JP | 10-27203 | 1/1998 |

\* cited by examiner

*Primary Examiner*—Ramesh Patel
*Assistant Examiner*—Edward F. Gain
(74) *Attorney, Agent, or Firm*—Sughrue Mion, PLLC

(57) ABSTRACT

A process control system for controlling processes has a work flow display for displaying on a screen a work flow in which a plurality of processes constituting a work is represented in form of a diagram. The work flow display displays on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed.

8 Claims, 16 Drawing Sheets

51

| ORDER Nos. | ARTICLE NAME | WORK FLOW Nos. |
|---|---|---|
| 1234 | LEAFLET 1 | 20355 |
| 1235 | BILL 2 | 30367 |
| 1236 | LEAFLET 32 | 10035 |
| 1237 | INFORMATION OF SPRING | 30443 |
| 1238 | CAMPAIGN LEAFLET | 20356 |
| . | | |

| WORK FOLW Nos. | ORDERS | INPUT AREA ATTRIBUTES | PROCESS AREA ATTRIBUTES | OUTPUT AREA ATTRIBUTES |
|---|---|---|---|---|
| 20355 | 1 | | | |
| 20355 | 2 | | | |
| 20355 | 3 | | | |
| 20355 | 4 | | | |
| . | | | | |

Fig. 13 (b)

PROCESS CONTROL SYSTEM AND PROCESS CONTROL PROGRAM STORAGE MEDIUM

BACKGROUND OF THE INVENTION

1. Field of the Invention

The present invention relates to a process control system for performing a process control of work comprising a plurality of processes, and a process control program storage medium.

2. Description of the Related Art

Hitherto, there is advanced a development of a process control system in which a computer system is used to control a plurality of regular works or irregular works. As the process control system, there are proposed various types of schemes. One of the various types of schemes, there is a process control system in which a work-flow representative of a plurality of processes in form of a diagram is displayed on a display screen of the computer system, and thereby permitting editing of the work flow and monitoring of a state of progress of the respective process on the display screen.

For example, Japanese Patent Application Laid Open Gazette Hei. 9-22433 discloses a dynamic planning management apparatus and a dynamic planning management method each comprising work flow control means for performing editing or storage of work flow data specifying a work flow defined by an order relation among a plurality of processes having at least workers as attributes, said work flow control means grasping a state of progress of processes, individual work instruction means for performing a display of work instruction to a person in charge with respect to processes assigned in accordance with the work flow data and an alteration of processes by a person in charge, and planning data management means for collecting and displaying the most up-to-date work flow data with respect to the respective work flow and the associated work flow selected in accordance with planning data as to a dependent relation among the work flows and the like.

However, while this scheme proposes such a concept of work flow that a plurality of processes are represented on a visual basis, the work flow is simply representative of a state of progress of processes and work instructions to a person in charge. Thus, Japanese Patent Application Laid Open Gazette Hei. 9-22433 fails to disclose a process control system in which a computer is adopted so that a use fertile in flexibility can be expected.

For this reason, according to the process control system adopting the conventional work flow, in most cases, a work flow is displayed on a display screen of a computer, and there is a need that operation of starting applications associated with processes constituting the work flow is performed as unrelated operation to the work flow on the display screen. In some case, there is a process control system adopting such a scheme that an application is started and a hot holder is monitored, and a desired file is dropped into the hot holder. However, the process control system adopting the conventional work flow is low in operability and is far from practical.

In the Macintosh computer system, there exists a mechanism capable of automating a work flow by a programming language addressed by "Apple Script". In this case, there is a need to create logic for automation by the programming language beforehand, and thus, it is difficult to do over again definition of a work flow at the scene of a production control and to alter an order of processes. This involves a problem that operability at the scene is low.

SUMMARY OF THE INVENTION

In view of the foregoing, it is an object of the present invention to provide a process control system adopting a work flow, which is high in operability and is capable of expecting a use fertile in flexibility, and a process control program storage medium.

To achieve the above-mentioned object, the present invention provides a process control system for controlling processes, comprising:

work flow display means for displaying on a screen a work flow in which a plurality of processes constituting a work is represented in form of a diagram, wherein said work flow display means displays on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed.

In the process control system according to the present invention as mentioned above, it is preferable that at least one process of a plurality of processes represented by a plurality of process display units constituting the work flow displayed on the screen is an automatic processing process in which a processing procedure according to the process is executed taking as a processing object a file in a processing object folder associated with the process, and processing procedure execution means for creating a file representative of a processing result is associated with a processing result folder associated with the process, and said process control system further comprises first file transfer means for transferring a file represented by a desired one of file display units, each of which is a display unit representative of a file, to a processing object folder in which the file represented by the desired file display unit is associated with an automatic processing process on the work flow, in accordance with an operation in which the desired file display unit is associated with an input area of a process display unit representative of the automatic processing process.

In the process control system according to the present invention as mentioned above, it is preferable that said processing procedure execution means includes execution condition set up means for setting up conditions related to execution of the processing procedure when the processing procedure is executed.

In the process control system according to the present invention as mentioned above, it is preferable that said process control system further comprises second file transfer means for transferring a file formed on a processing result folder associated with a preceding process of an automatic processing process constituting the work to a processing object folder of a subsequent automatic processing process.

In process control system according to the present invention as mentioned above, it is preferable that said preceding process is also the automatic processing process, and said second file transfer means is arranged in such a manner that when a file representative of a processing result is created in a processing result folder associated with said preceding process by execution of the process procedure by the processing procedure execution means associated with the preceding process, the file is transferred to the processing object folder associated with the subsequent automatic processing process.

In the process control system according to the present invention as mentioned above, it is preferable that said second file transfer means transfers the file represented by a desired file display unit to the processing object folder associated with the subsequent automatic processing process in accordance with an operation for associating the desired file display unit with an output area of a process display unit representative of the preceding process, using a handler.

In the process control system according to the present invention as mentioned above, it is preferable that said work flow display means includes progress state display means for partially altering a display form of the work flow to display on the screen a state of progress of the work represented by the work flow.

To achieve the above-mentioned object, the present invention provides a process control program storage medium storing a process control program which causes a computer system to operate as a process control system for controlling processes, said process control system including work flow display means for displaying on a screen a work flow in which a plurality of processes constituting a work is represented in form of a diagram, wherein said process control program has said work flow display means for displaying on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed.

As mentioned above, a process control system according to the present invention is provided with work flow display means for displaying on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed. This feature makes it possible to control processes in accordance with a complete automatic processing scheme, control flexible processes by a mouse operation and the like, and interpose the processing procedure by a manual operation. Thus, it is possible to implement a process control system capable of expecting a use fertile in flexibility.

BRIEF DESCRIPTION OF THE DRAWINGS

FIGS. 13($a$) and 13($b$) are views each showing a work flow table stored in a work flow storage area of a server machine.

DETAILED DESCRIPTION OF PREFERRED EMBODIMENTS

Embodiments of the present invention will be described with reference to the accompanying drawings.

Figure 1:
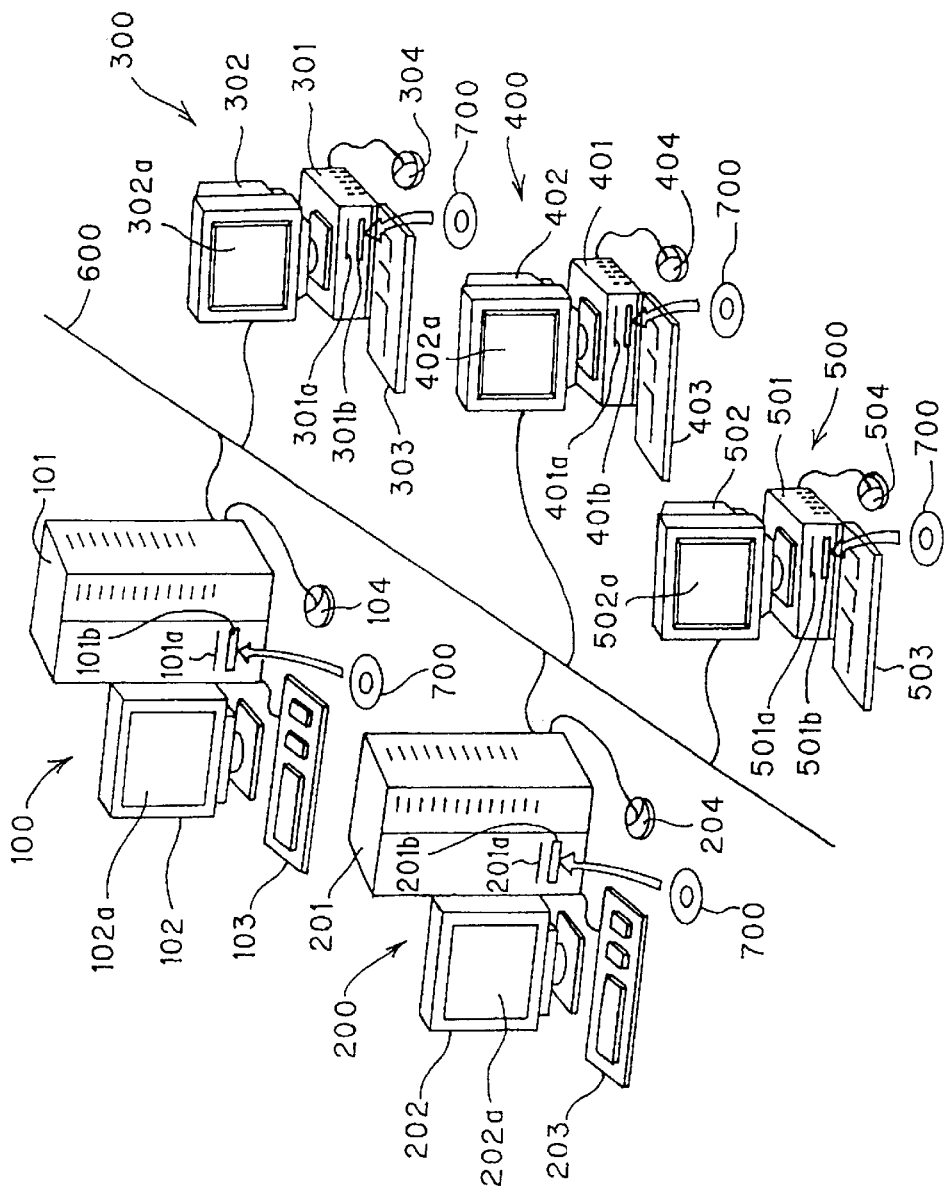
FIG. 1 is a schematic construction view of a computer system in which an embodiment of a process control system according to the present invention is applied.

FIG. 1 is a schematic construction view of a computer system in which an embodiment of a process control system according to the present invention is applied.

FIG. 1 exemplarily shows two server machines 100 and 200 and three client machines 300, 400 and 500, which constitute a process control system of the present embodiment. The server machines 100 and 200 and the client machines 300, 400 and 500 are connected to one another via a communication line 600 such as a LAN (Local Area Network).

The two server machines 100 and 200 are each constituted of a high speed and large capacity of computer system, for example, a workstation. The three client machines 300, 400 and 500 are each constituted of a relatively small type of computer system, for example, a personal computer.

The server machines 100 and 200 and the client machines 300, 400 and 500 respectively comprise: main frames 101, 201, 301, 401 and 501 each incorporating therein a CPU (Central Processing Unit), a RAM (Random Access Memory), a hard disk, and a communicating board; display units 102, 202, 302, 402 and 502 for displaying images and strings of characters on display screens 102$a$, 202$a$, 302$a$, 402$a$ and 502$a$ in accordance with instructions from the main frames 101, 201, 301, 401 and 501, respectively; keyboards 103, 203, 303, 403 and 503 for inputting user's instructions to the server machines 100 and 200 and the client machines 300, 400 and 500; and mice 104, 204, 304, 404 and 504 for inputting orders associated with icons or the like displayed on positions on the display screens 102$a$, 202$a$, 302$a$, 402$a$ and 502$a$ when the positions are designated, respectively.

Further, a hard disk of either one or both of the two server machines 100 and 200 is provided with a database storing information relating to a process control, so that the respective users can access the database for process control constructed on the server machines 100 and 200 through the communication line 600 from the client machines 300, 400 and 500.

The main frames 101 and 201 of the server machines have, on the outside appearance, floppy disk drives 101*a* and 201*a* onto which floppy disks are loaded, and CD-ROM drives 101*b* and 201*b* onto which CD-ROMs 700 are loaded, respectively. Inside the floppy disk drives 101*a* and 201*a* and the CD-ROM drives 101*b* and 201*b*, there are incorporated floppy disk drivers for driving the floppy disks loaded through the floppy disk drives 101*a* and 201*a* and CD-ROM drivers for driving the CD-ROMs 700 loaded through the CD-ROM drives 101*b* and 201*b*, respectively.

Similarly, the main frames 301, 401 and 501 of the client machines have, on the outside appearance, floppy disk drives 301*a*, 401*a* and 501*a* onto which floppy disks (not illustrated) are loaded, and CD-ROM drives 301*b*, 401*b* and 501*b* onto which CD-ROMs 700 are loaded, respectively. Inside the floppy disk drives 301*a*, 401*a* and 501*a* and the CD-ROM drives 301*b*, 401*b* and 501*b*, there are incorporated floppy disk drivers for driving the floppy disks loaded through the floppy disk drives 301*a*, 401*a* and 501*a* and CD-ROM drivers for driving the CD-ROMs 700 loaded through the CD-ROM drives 301*b*, 401*b* and 501*b*, respectively.

Figure 2:
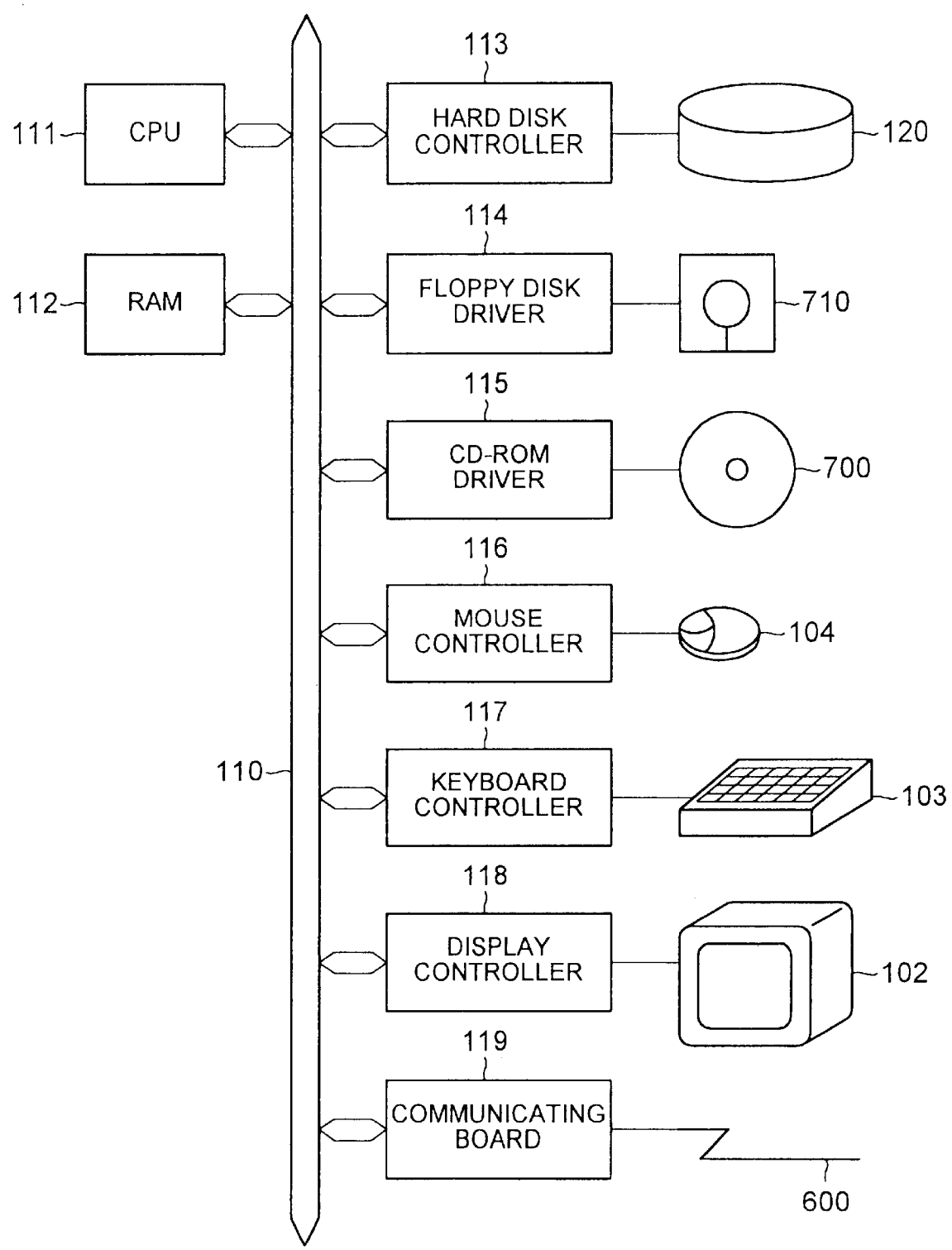
FIG. 2 is a hardware construction view of the computer system for the process control system having the outside appearance shown in FIG. 1.

FIG. 2 is a hardware construction view of the computer system having the outside appearance shown in FIG. 1.

The hardware construction view of the computer system shows a CPU 111, a RAM 112, a hard disk controller 113, a floppy disk driver 114, a CD-ROM driver 115, a mouse controller 116, a keyboard controller 117, a display controller 118, and a communicating board 119. Those are connected to one another through a bus 110.

Inside the floppy disk driver 114 and the CD-ROM driver 115, as described referring to FIG. 1, the floppy disk 710 and the CD-ROM 700 are loaded, respectively. The floppy disk driver 114 and the CD-ROM driver 115 drive the floppy disk 710 and the CD-ROM 700 loaded, respectively.

The communicating board 119 is connected to the communication line 600.

FIG. 2 further shows a hard disk 120 to be accessed by the hard disk controller 113, a mouse 104 to be controlled by the mouse controller 116, a keyboard 103 to be controlled by the keyboard controller 117, and a CRT display 102 to be controlled by the display controller 118.

Next, there will be described a structure of a process control system according to the embodiment of the present invention.

Figure 3:
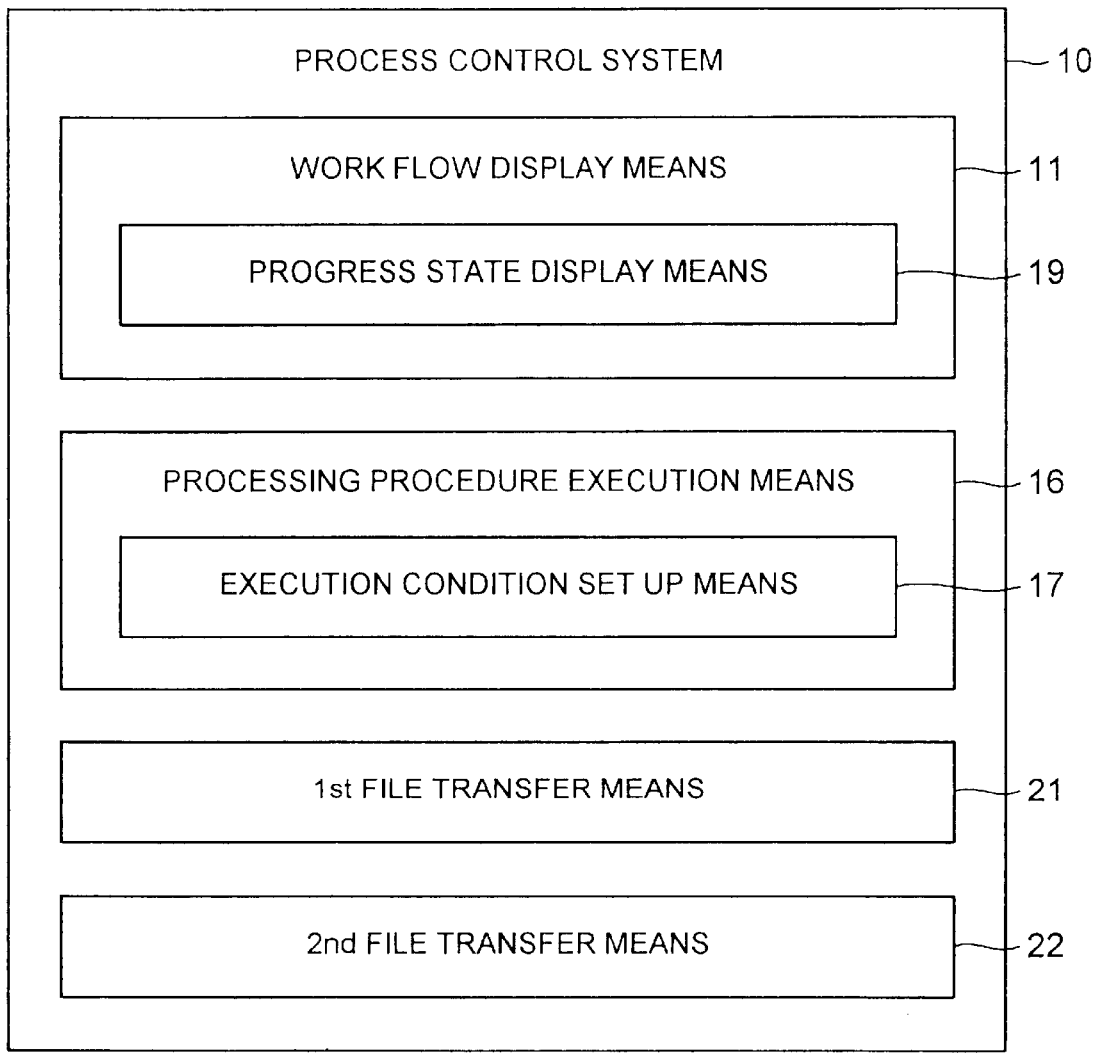
FIG. 3 is a schematic construction view of a process control system according to an embodiment of the present invention.

FIG. 3 is a schematic construction view of a process control system according to an embodiment of the present invention.

As shown in FIG. 3, a process control system 10 comprises work flow display means 11, processing procedure execution means 16, first file transfer means 21 and second file transfer means 22.

The work flow display means 11 displays on a display screen a work flow in which a plurality of processes constituting a work is represented in form of a diagram.

The processing procedure execution means 16 executes a processing procedure according to a process wherein a file in a processing object folder associated with the process is established as an object to be processed, so that a file representative of a processing result is created on a processing result folder associated with the process.

The first file transfer means 21 transfers a file represented by a desired one of file display units, each of which is a display unit representative of a file, to a processing object folder in which the file represented by the desired file display unit is associated with an automatic processing process on a work flow, in accordance with an operation in which the desired file display unit is associated with an input area of a process display unit representative of the automatic processing process.

The second file transfer means 22 transfers a file formed on a processing result folder associated with the preceding process of an automatic processing process constituting a work to a processing object folder of the subsequent automatic processing process.

Figure 4:
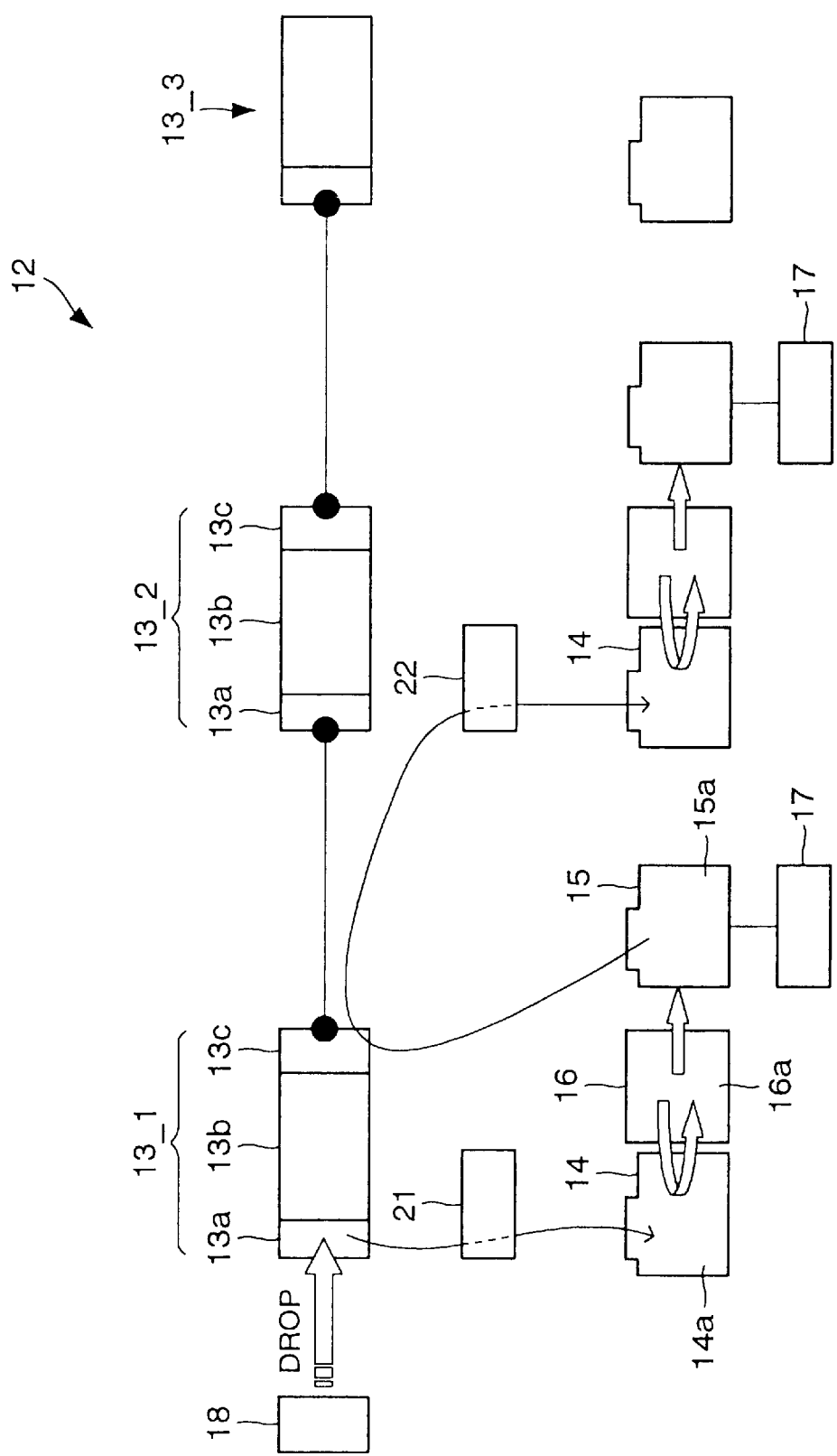
FIG. 4 is an explanatory view of a work flow in an embodiment of a process control system according to the present invention.

FIG. 4 is an explanatory view of a work flow in an embodiment of a process control system according to the present invention.

As shown in FIG. 4, a work flow 12, in which a plurality of process display units 13_1, 13_2, 13_3, . . . each represented by a diagram consisting of a process area 13*b* representative of a process, an input area 13*a* representative of a processing object in the process and an output area 13*c* representative of a processing result in the process, is coupled over a plurality of stages in a sequence that a work is formed, is displayed on a display screen by the work flow display means 11 of the present embodiment (cf. FIG. 3). Incidentally, the work flow display means 11 includes, as shown in FIG. 3, progress state display means 19 for partially altering a display form of the work flow 12 to display on a display screen a state of progress of the work represented by the work flow 12. An operation of the progress state display means 19 will be described later.

The processing procedure execution means 16 executes, as shown in FIG. 4, a processing procedure 16*a* according to a process wherein a file 14*a* in a processing object folder 14 associated with the process is established as an object to be processed, so that a processing result file 15*a* representative of a processing result is created on a processing result folder 15 associated with the process.

In the process control system 10 of the present embodiment, at least one of a plurality of stages of processes, which is represented by a plurality of process display units 13_1, 13_2, 13_3, . . . constituting the work flow 12 displayed on the display screen, is formed in form of an automatic processing process with which the processing procedure execution means 16 executing a processing procedure 16*a* according to the process.

The first file transfer means 21 transfers a file represented by a desired file display unit 18 to a processing object folder 14 in which the file represented by the desired file display unit 18 is associated with an automatic processing process on the work flow 12, in accordance with an operation by a handler in which the desired file display unit 18 is associated with an input area 13*a* of a process display unit 13_1 representative of the automatic processing process on the work flow 12, for example, a drag and drop operation by a mouse and so forth. The file transferred to the processing object folder 14 is subjected to an automatic processing by a first stage of processing procedure 16*a* so that the processing result file 15*a* is created on a first stage of processing result folder 15. Next, the processing result file 15*a* is transferred to the processing object folder 14 in second stage of process display unit 13_2 by the second file transfer means 22. The processing result file 15*a* transferred to the processing object folder 14 is subjected to an automatic processing by a second stage of processing procedure 16*a* so that the processing result file 15a is created on a second stage of processing result folder 15. Further, the processing result file 15a is transferred to the processing object folder 14 in third stage of process display unit 13_3 by the second file transfer means 22. The processing result file 15a transferred to the processing object folder 14 is subjected to an automatic processing by a third stage of processing procedure 16a so that the processing result file 15a is created on a third stage of processing result folder 15. In this manner, a plurality of processes can be continuously subjected to an automatic processing.

In addition to a first mode that is involved in the above-mentioned continuous automatic processing scheme, according to the present embodiment of the present invention, it is possible to perform processing in accordance with a second mode and a third mode.

The second mode relates to a processing scheme in which a processing procedure by a user operation is executed in accordance with an execution condition set up by execution condition set up means 17 included in the processing procedure execution means 16. The third mode relates to a processing scheme in which the processing procedure itself by the processing procedure execution means 16 is set up in form of a manual processing procedure by a user.

Those second and third modes will be described later.

Next, there will be described a process control program storage medium of the present invention.

Figure 5:
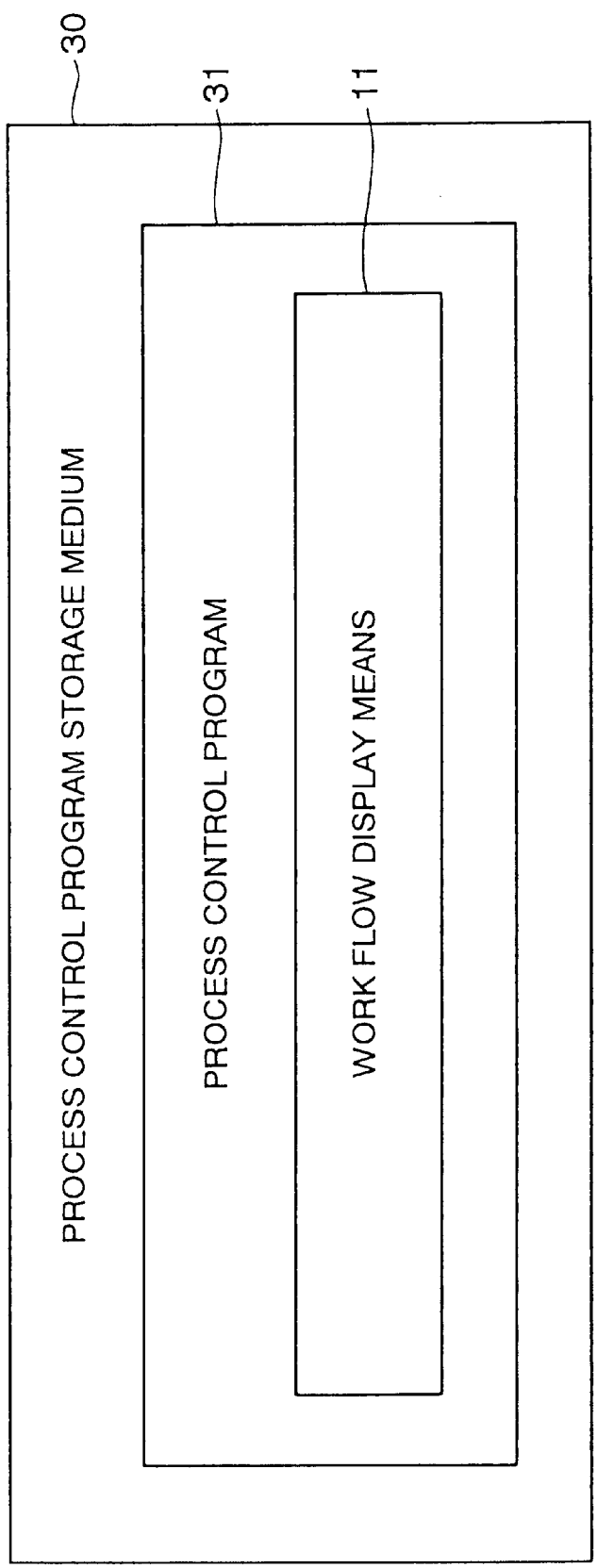
FIG. 5 is a schematic construction view of a first embodiment of a process control program storage medium of the present invention.

FIG. 5 is a schematic construction view of a first embodiment of a process control program storage medium of the present invention.

The process control program storage medium of the present embodiment stores therein a process control program which causes a computer system to operate as a process control system for controlling processes, including work flow display means for displaying on a display screen a work flow, in which a plurality of processes constituting a work is represented in form of a diagram wherein the plurality of processes is coupled over a plurality of stages in a sequence that the work is formed.

As shown in FIG. 5, a process control program storage medium 30 stores a process control program 31 having work flow display means 11 for displaying on the display screen the work flow 12 (cf. FIG. 4).

Incidentally, it is acceptable that the process control program 31 stored in the process control program storage medium 30 includes the processing procedure execution means 16, the first file transfer means 21 and the second file transfer means 22 in the process control system of the first embodiment of the present invention explained referring to FIG. 3. Further, it is acceptable that the work flow display means 11 includes execution condition set up means 17. And it is acceptable that the processing procedure execution means 16 includes the progress state display means 19.

A sort of the storage medium used for the process control program storage medium 30 is not restricted, and any one is acceptable, as the storage medium, which is able to store the process control program 31. That is, as the storage medium, it is possible to use a desired storage medium, for example, a hard disk, a CD-ROM, a CD-R/RW, a MO (magneto-optical disk), a floppy disk, etc.

The process control program storage medium 30, in which the process control program 31 is stored in the storage medium, for example, CD-ROM 700, is loaded onto the CD-ROM drives 101b, 201b, 301b, 401b, 501b (cf. FIG. 1) of the server machines 100 and 200 and the client machines 300, 400 and 500 (cf. FIG. 1), so that the process control program 31 is installed in the memory units of the server machines and the client machines, and thereby constructing a process control system on the client server system.

Next, there will be described operations of a process control system of the present embodiment.

Hereinafter, there will be described an embodiment in a print work.

Usually, an application software of a pre-press process in a print work is disposed, as shown in FIG. 1, on the server machines and the client machines which are connected to each other via a network such as the LAN 600. In this case, it happens that an application software file is placed on the file server or the client machine.

A user of the process control system is assorted into a work flow setter who defines a work flow and sets up the defined work flow on a work flow set up screen, a real worker who performs operations for a process control in accordance with a work flow set up, and a process control planner who sets up sections in charge of processes and names of persons in charge. Those works are not restricted to a particular person, and it is acceptable that a person is placed in charge of a plurality of works.

A set up work for the work flow is mainly performed in the server machine, and the client machine mainly performs a process control using a set up work flow.

Figure 6:
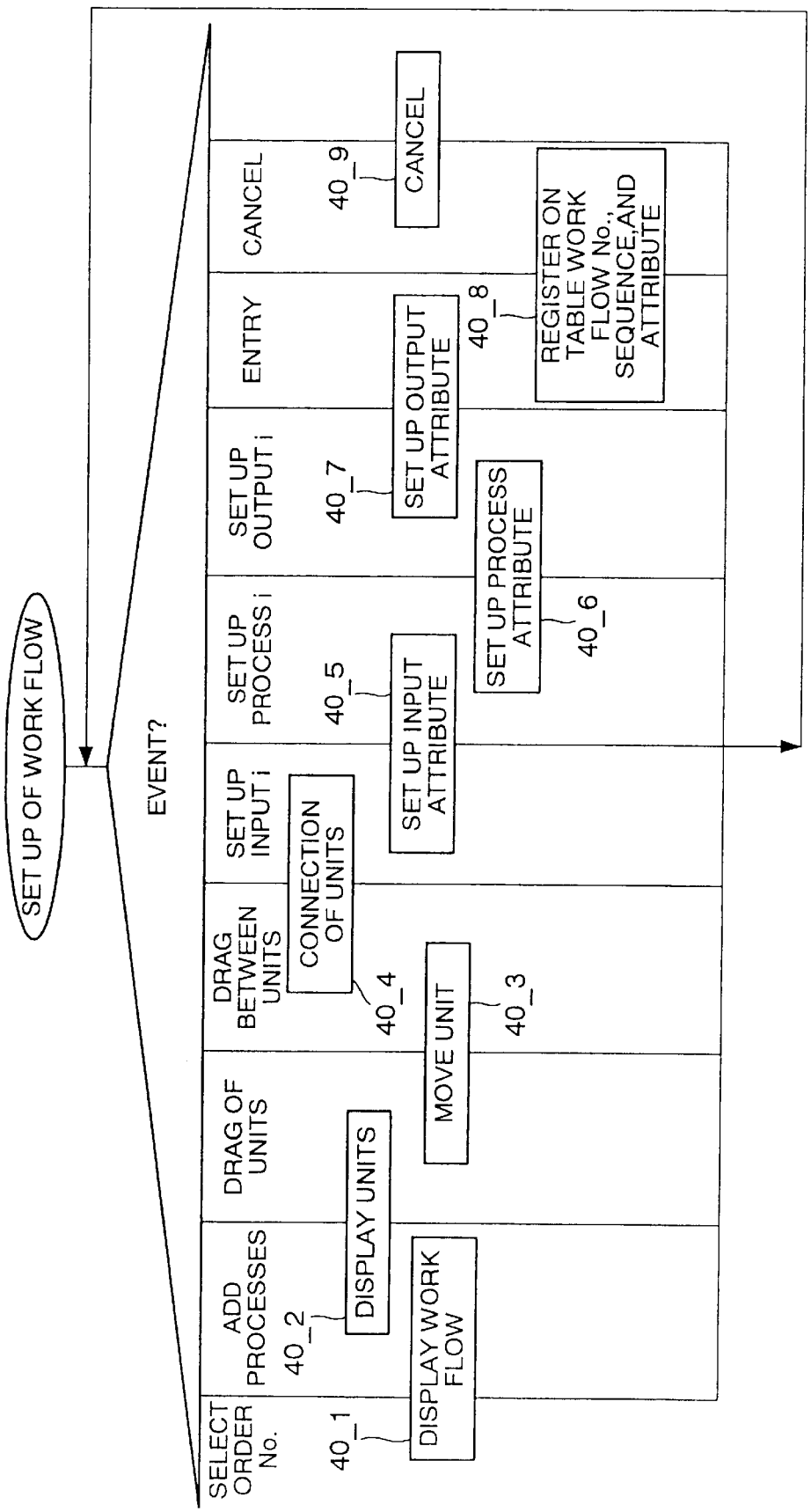
FIG. 6 is a flowchart useful for understanding a work flow set up work in a process control system in the present embodiment.
Figure 7:
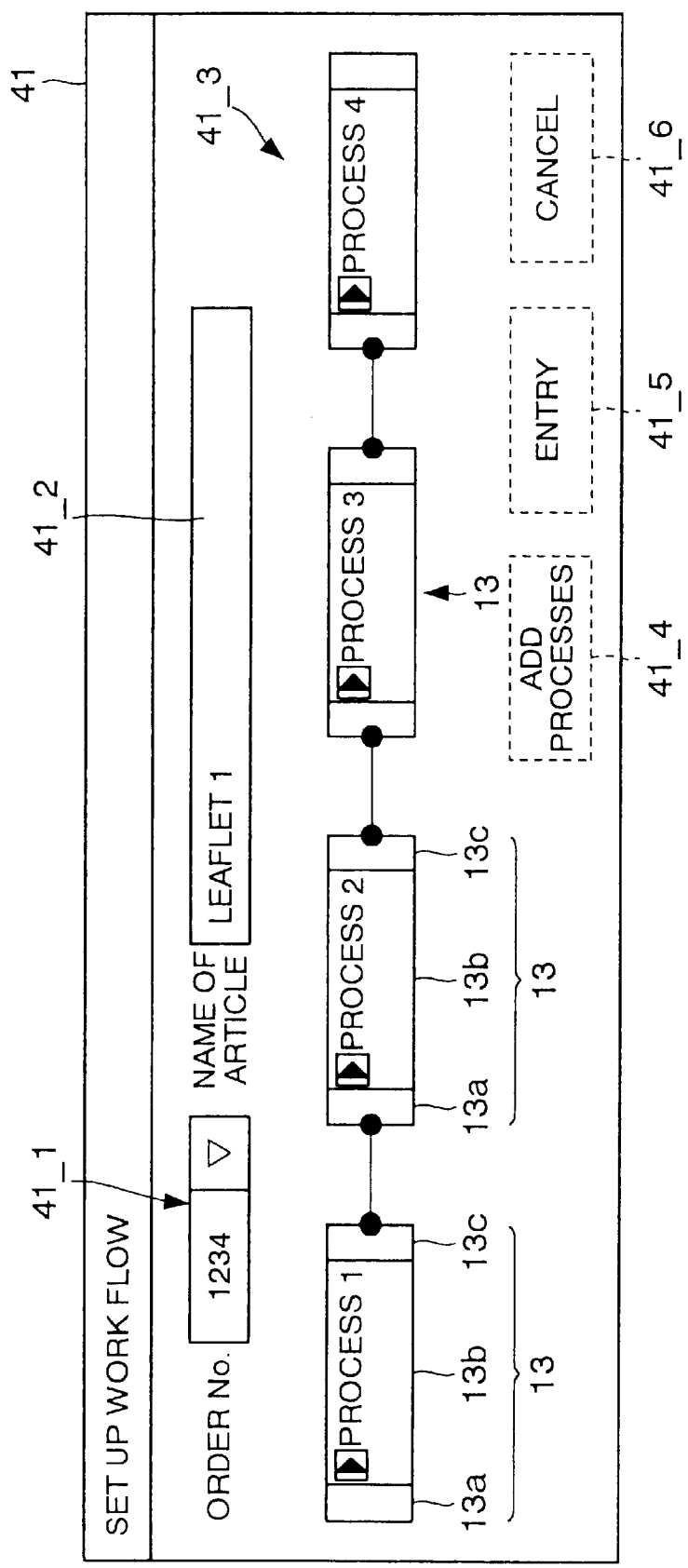
FIG. 7 is a view showing a work flow set up screen used in the work flow set up work.
Figure 8:
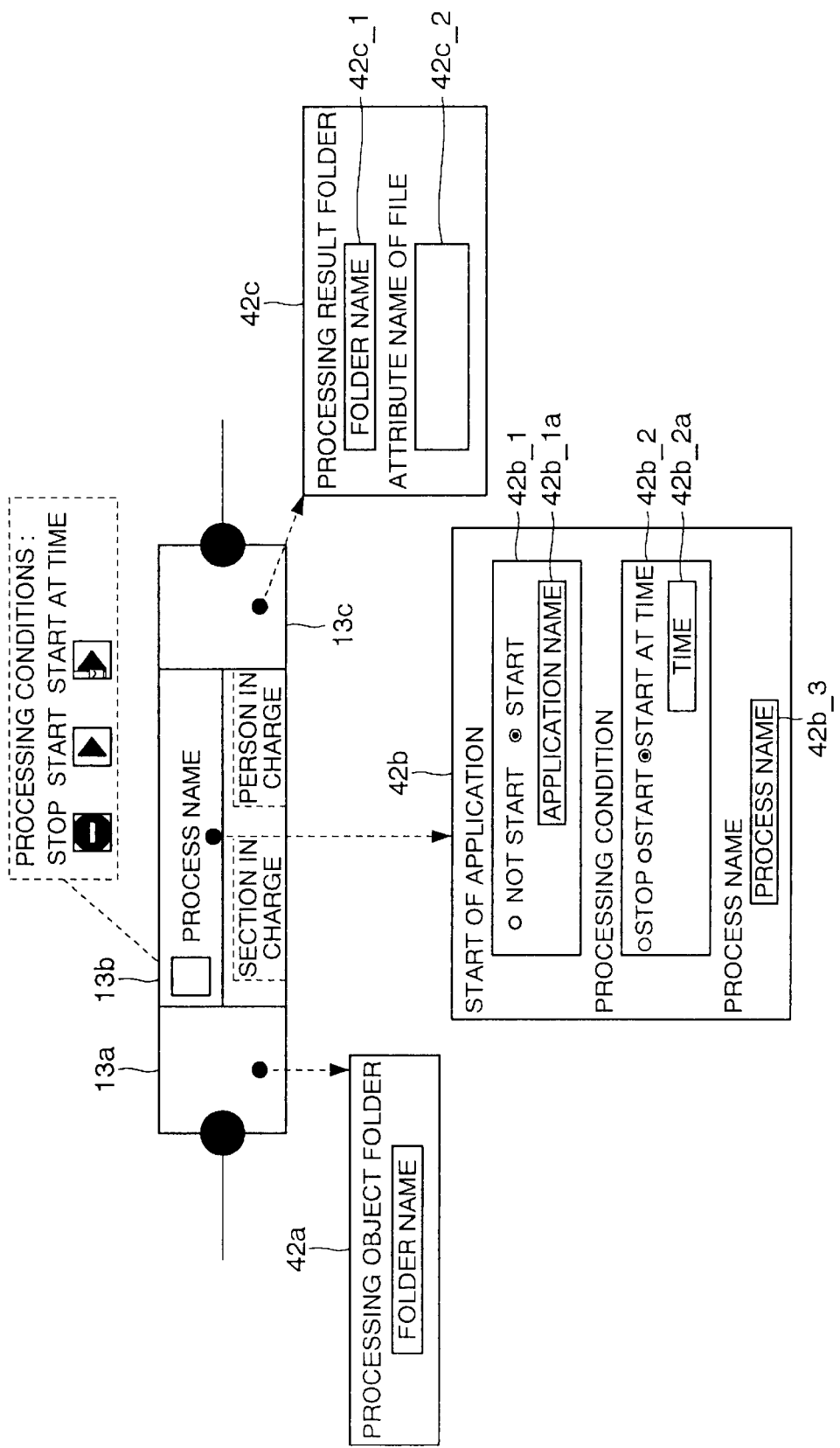
FIG. 8 is a view showing three sorts of dialog opened in the work flow set up screen.

FIG. 6 is a flowchart useful for understanding a work flow set up work in a process control system in the present embodiment. FIG. 7 is a view showing a work flow set up screen used in the work flow set up work. FIG. 8 is a view showing three sorts of dialog opened in the work flow set up screen.

A work flow set up work shown in FIG. 6 is performed using a work flow set up screen 41 shown in FIG. 7. As shown in FIG. 6, this flowchart is provided with nine routines of a work flow display routine 40_1, a process display unit display routine 40_2, a process display unit movement routine 40_3, a process display unit connection routine 40_4, an input attribute set up routine 40_5, a process attribute set up routine 40_6, an output attribute set up routine 40_7, a work flow registration routine 40_8, and a cancel routine 40_9.

The work flow set up screen 41 shown in FIG. 7 is provided with an order number selection area 41_1, an article name display area 41_2, a work flow display area 41_3, a process addition button 41_4, a registration button 41_5 and a cancel button 41_6.

On the work flow display area 41_3, there is displayed the work flow 12 in which a plurality of process display units 13 each comprising the input area 13a, the process area 13b and the output area 13c, which is set up by an operation of the work flow set up screen 41, is coupled with each other.

When those areas or buttons are clicked by the mouse, the above-mentioned nine routines start.

Next, there will be described operations of the above-mentioned nine routines.

Selection of the order number in the order number selection area 41_1 causes the work flow display routine 40_1 to start so that the name of an article is displayed on the article name display area 41_2, and the work flow 12 is displayed on the work flow display area 41_3.

When the process addition button 41_4 is depressed, the process display unit display routine 40_2 starts, so that the process display units 13 are additionally displayed on the display screen.

One of the process display units 13 displayed on the display screen is dragged by the mouse, the process display unit movement routine 40_3 starts, so that the process display units 13 can be moved to a desired position.

When the mouse drags between two process display units 13, the process display unit connection routine 40_4 starts, so that the two process display units 13 are connected to one another.

When the input area 13a of a desired process display unit 13 on the work flow set up screen 41 (cf. FIG. 7) is double-clicked, the associated input attribute set up routine 40_5 starts, so that a processing object folder dialog 42a associated with the process is opened on the display screen, as shown in FIG. 8. When the name of a folder is inputted into the processing object folder dialog 42a, a processing object folder name associated with the process is displayed on the input area 13a of the associated process display unit 13 on the work flow set up screen 41.

Figure 9:
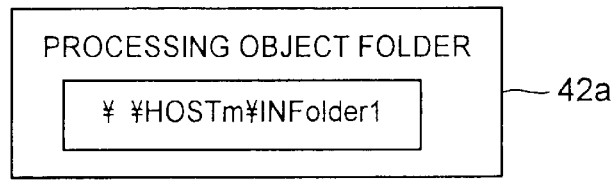
FIG. 9 is a view showing an input example to a processing object folder dialog.

FIG. 9 is a view showing an input example to a processing object folder dialog.

FIG. 9 shows a state that the processing object folder name such as "¥¥HOSTm¥INFolder1" is entered into the processing object folder dialog 42a.

Now returning to the explanation of FIG. 7, when the process area 13b of a desired process display unit 13 on the work flow set up screen 41 (cf. FIG. 7) is double-clicked, the associated process attribute set up routine 40_6 starts, so that a processing procedure execution dialog 42b associated with the process is opened on the display screen, as shown in FIG. 8. Either "start" or "not start" is selected in a "start of application" set up area 42b_1 of the processing procedure execution dialog 42b, and an application name input is inputted into an application name input window 42b_1a. Further, either "stop", "start" or "start at time" is selected in a "processing condition" set up area 42b_2, and time is inputted into a time input window 42b_2a. The name of a process is set up in a "process name" set up area 42b_3. A set up result on the processing procedure execution dialog 42b by the process attribute set up routine 40_6 is reflected on the process area 13b of the associated process display unit 13 on the work flow set up screen 41.

Figure 10:
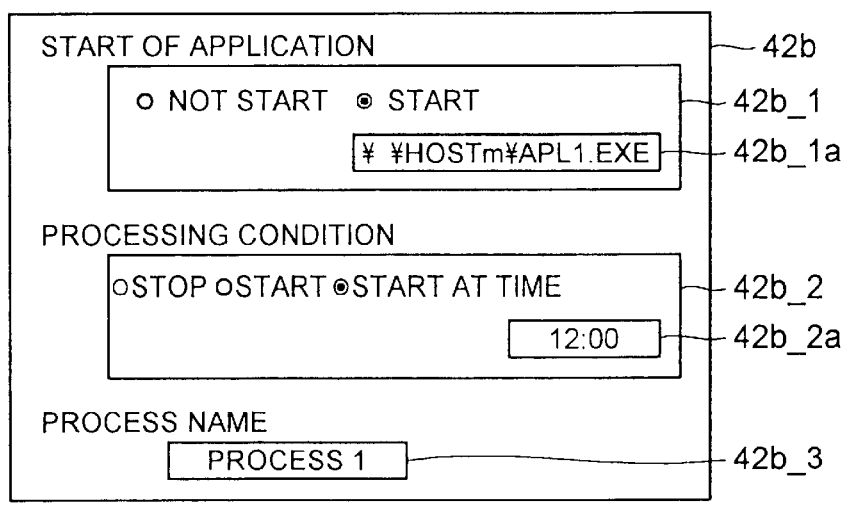
FIG. 10 is a view showing an input example to a processing procedure execution dialog.

FIG. 10 is a view showing an input example to a processing procedure execution dialog.

FIG. 10 shows a state that an application of "¥¥HOSTm¥APL1.EXE" is defined on the condition of "start" in the application name input window 42b_1a of the "start of application" set up area 42b_1 of the processing procedure execution dialog 42b, a time of "12:00" is defined on the condition of "start at time" in the time input window 42b_2a of the "processing condition" set up area 42b_2, and the name of a process of "process 1" is defined in the "process name" set up area 42b_3.

Now returning to FIG. 7, the explanation of the work flow set up will be continued. Also with respect to the output area 13c, in a similar fashion to that of the input area 13a, when the output area 13c of a desired process display unit 13 on the work flow set up screen 41 (cf. FIG. 7) is double-clicked, the associated output attribute set up routine 40_7 starts, so that a processing result folder dialog 42c is opened on the display screen, as shown in FIG. 8. The name of a folder is inputted into a "processing result folder" set up area 42c_1 of the processing result folder dialog 42c, and a file attribute list is inputted into an "attribute list of a file" set up area 42c_2 of the processing result folder dialog 42c, so that the processing result folder name associated with the process is displayed in the output area 13c of the associated process display unit 13 on the work flow set up screen 41.

Figure 11:
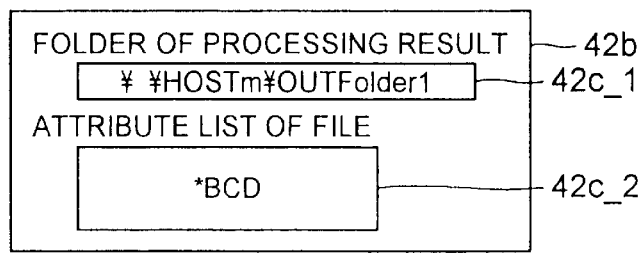
FIG. 11 is a view showing an input example to a processing result folder dialog.

FIG. 11 is a view showing an input example to a processing result folder dialog.

FIG. 11 shows a state that "¥¥HOSTm¥OUTFolder1" is inputted into a "processing result folder" set up area 42c_1 of the processing result folder dialog 42c, and "*.BCD" is inputted into the "attribute list of a file" set up area 42c_2 of the processing result folder dialog 42c. Thus, definition of the "attribute list of a file" makes it possible, when a process control is performed using the work flow, to determine whether the processing result file created in the processing result folder "OUTFolder1" is a file having "*.BCD" defined in the "attribute list of a file" set up area 42c_2 of the processing result folder dialog 42c, and thereby preventing a malfunction of the process control system due to the erroneous operation of a file.

Now returning to FIG. 7, the explanation of the work flow set up will be continued. When the registration button 41_5 is depressed, the work flow registration routine 40_8 starts so that a result of the work flow set up work is registered in a database.

When the cancel button 41_6 is depressed during the work flow set up work, the cancel routine 40_9 starts so that a part or all of the result of the work flow set up work can be cancelled.

In this manner, an operator can define the work flow 12 using the work flow set up screen 41 shown in FIG. 7 and the dialogs shown in FIG. 8.

The work flow 12 thus defined is saved in the databases of the server machines 100 and 200, and is referred to by the client machines 300, 400 and 500 as a necessity arises.

Figure 12:
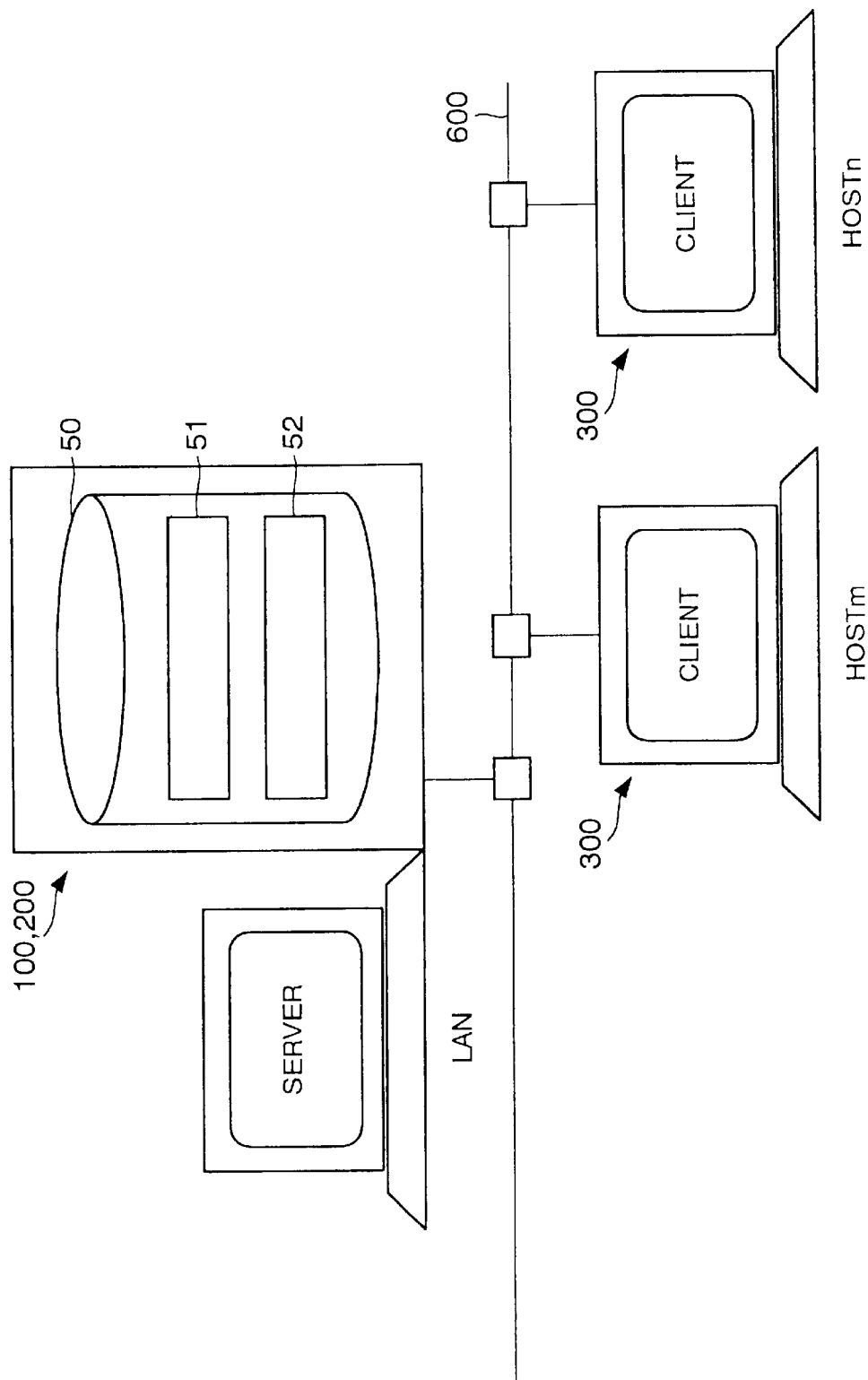
FIG. 12 is a view showing server machines storing work flow tables and clients referring to the work flow tables.

FIG. 12 is a view showing server machines storing work flow tables and clients referring to the work flow tables.

As shown in FIG. 12, each of the server machines 100 and 200 is provided with a work flow storage area 50 in which a first work flow table 51 and a second work flow table 52 are stored. The server machines 100 and 200 are connected via the LAN 600 to the client machines 300 and 400, . . . .

FIGS. 13(a) and 13(b) are views each showing a work flow table stored in a work flow storage area of a server machine.

As shown in FIGS. 13(a) and 13(b), a first work flow table 51 and a second work flow table 52 are stored in a work flow storage area 50 of each of the server machines 100 and 200, and are able to be referred to by the client machines 300 and 400, . . . via the LAN 600.

The first work flow table 51 is provided with three items of "order numbers", "article names" and "work flow numbers". The second work flow table 52 is provided with five items of "work flow numbers", "sequence", "input area attributes", "process area attribute" and "output area attribute".

Those two tables 51 and 52 are formed in form of a so-called relational database and are associated by the item "work flow numbers".

Next, there will be described the second mode and the third mode.

Here, it will be described as to how the first mode, the second mode and the third mode are determined.

The first mode is determined in accordance with set up in the processing result folder dialog 42c. That is, the second file transfer means 22 in the present embodiment is arranged in such a manner that when the processing result file 15a is created in the processing result folder 15 by execution of the process procedure associated with the preceding process 13_1, the processing result file 15a is transferred to the processing object folder 14 associated with the subsequent automatic processing process 13_2. Consequently, in the event that the processing result folder is defined in the "processing result folder" set up area 42c_1, as "¥¥HOSTm¥OUTFolder1", as shown in FIG. 11, at the time when the work flow is set up, the second file transfer means 22 monitors the "processing result folder" set up area 42c_1. And thus when the "processing result folder" set up area 42c_1 forms the processing result file 15a, the processing result file 15a is transferred to the processing object folder 14 associated with the process 13_2. Thus, the process 13_2 automatically starts, so that the process 13_1 and the process 13_2 are continuously processed in accordance with the first mode.

On the other hand, in the event that the processing result folder is not defined in the "processing result folder" set up area 42c_1, at the time when the work flow is set up, a file transfer is not performed, since the second file transfer means 22 has no information as to the processing result folder to be monitored. However, the second file transfer means 22 transfers the processing result file 15a to the processing object folder 14 associated with the process 13_2 by a drop operation for the processing result file 15a to the output area 13c of the process 13_1 by the mouse operation of a user who looks at a state of progress of a work displayed on the display screen by progress state display means (which will be described later). Thus, processing by the second mode is implemented.

Figure 14:
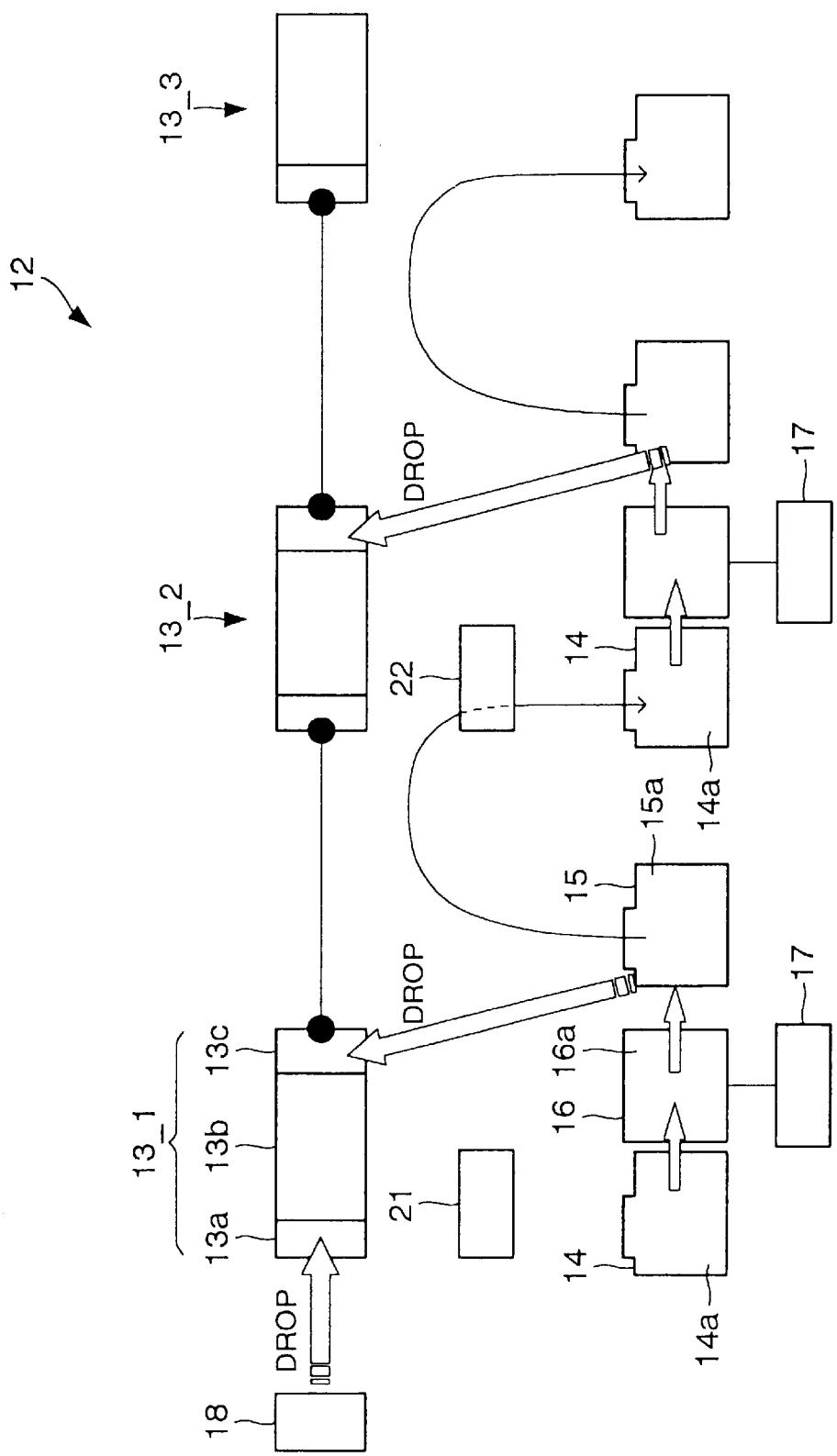
FIG. 14 is a view showing a second mode in the present embodiment of the present invention.

FIG. 14 is a view showing the second mode in the present embodiment of the present invention.

As shown in FIG. 14, a work flow 12, in which a plurality of process display units 13_1, 13_2, 13_3, . . . each represented by a diagram consisting of a process area 13b representative of a process, an input area 13a representative of a processing object in the process and an output area 13c representative of a processing result in the process, is coupled over a plurality of stages in a sequence that a work is formed, is displayed on a display screen by the work flow display means 11 of the present embodiment (cf. FIG. 3). In the second mode, the processing result file 15a created in the processing result folder 15 is not automatically transferred to the subsequent process of processing object folder 14. In this respect, the second mode is different from the first mode.

That is, according to the second mode, the second file transfer means 22 transfers the processing result file 15a created on the processing result folder 15 to the processing object folder 14 associated with the subsequent process display unit 13_2 by a drag and drop operation for associating the processing result file 15a with the output area 13c of the process display unit 13 using a handler such as a mouse.

Thus, according to the second mode, a mouse operation of a user stands between two processes. This feature makes it possible to perform a process control with higher degree of freedom than the first mode.

According to the third mode, when the work flow is set up, any definition is not given for the application name input window 42b_1a of the "start of application" set up area 42b_1 of the processing procedure execution dialog 42b shown in FIGS. 8 and 10, so that the processing in the process 13_1 becomes a manual processing by a user operation. Thus, the processing according to the third mode is implemented. According to the third mode, it is possible to create a work flow capable of performing a process control with higher degree of freedom than the first mode and the second mode.

Next, there will be explained a worker of a process control by a worker using a work flow.

The worker of a process control retrievals the first and second work flow tables 51 and 52 (refer to FIG. 13) on the work flow storage areas in the databases on the server machines 100 and 200 from the client machines 300, 400, . . . shown in FIG. 12 to cause a desired work flow to display on a display screen of one's own client machine.

Figure 15:
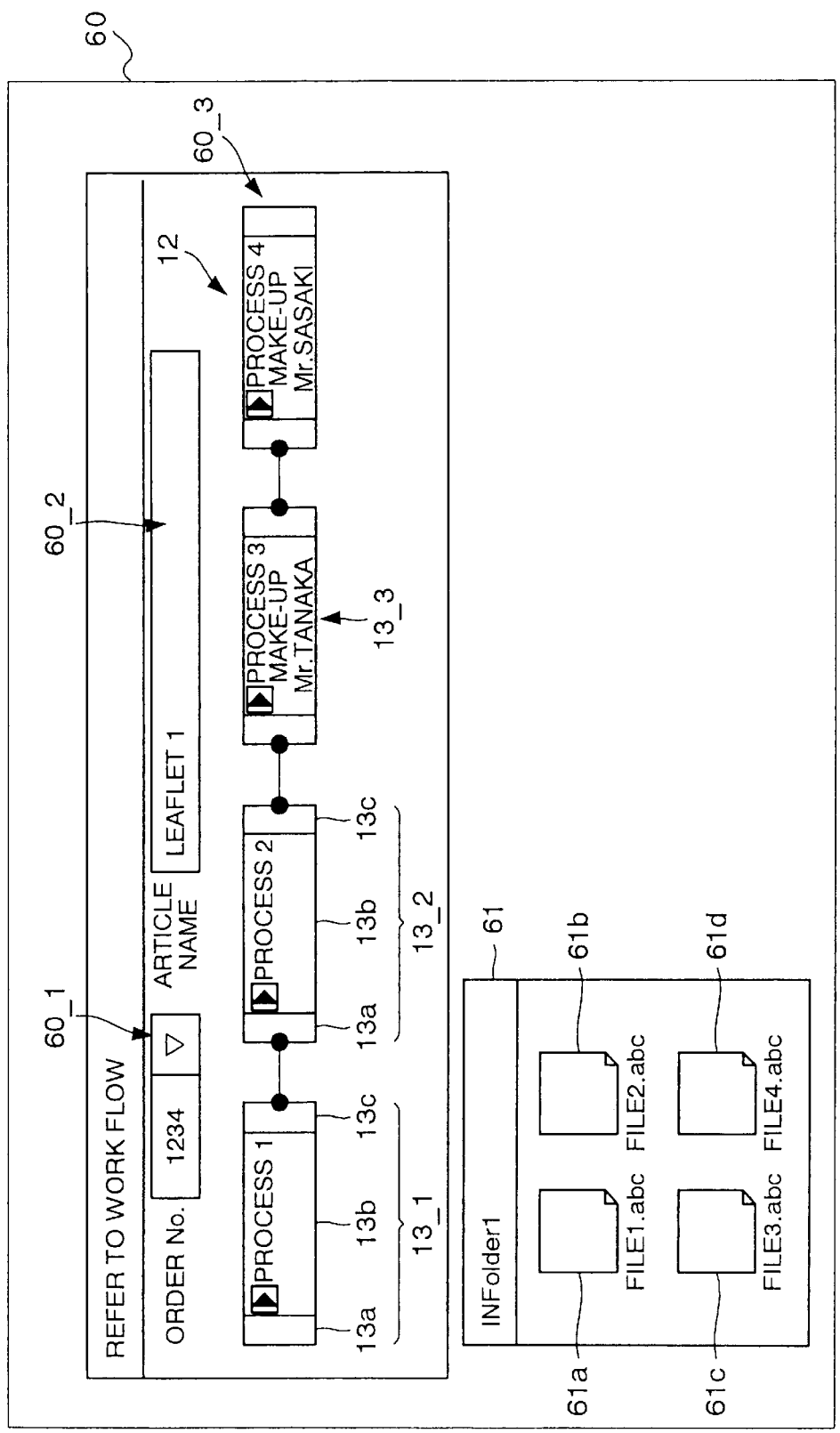
FIG. 15 is a view showing a work flow displayed on a client machine.

FIG. 15 is a view showing a work flow displayed on a client machine.

A work flow display screen 60 shown in FIG. 15 is provided with an order number selection area 60_1 for selecting an order number, an article name display area 60_2 for displaying names of article, a work flow display area 60_3 for displaying work flows, and an input file display area 61 for designating a file to be associated with an input area of a process display unit on a work flow.

In the work flow display area 60_3, there is displayed a work flow 12 defined by the work flow set up screen 41 shown in FIG. 7, in which a plurality of process display units 13 each comprising the input area 13a, the process area 13b and the output area 13c is coupled in accordance with a structural order of the work.

As mentioned above, the process control system of the present embodiment is provided with the progress state display means 19 (cf. FIG. 3). The progress state display means 19 partially alters a display form of the work flow 12, for example, a background color of the input area 13a, the process area 13b and the output area 13c of each process display unit 13, to display on a display screen a state of progress of the work represented by the work flow 12. The following explanation shows an example in which the background color of the input area 13a, the process area 13b and the output area 13c is altered to "red" in the event that processing in the associated area is initiated, and is altered to "green" in the event that processing in the associated area is terminated. However, the display form of the work flow 12 is not restricted to only the background color, and it is acceptable that a state of progress is indicated by means of blinking the areas or performing a reversed display.

In the input file display area 61, there are displayed file names 61a, 61b, 61c, 61d, . . . which are candidates of a file to be associated with the input area 13a of the process display unit 13.

Figure 16:
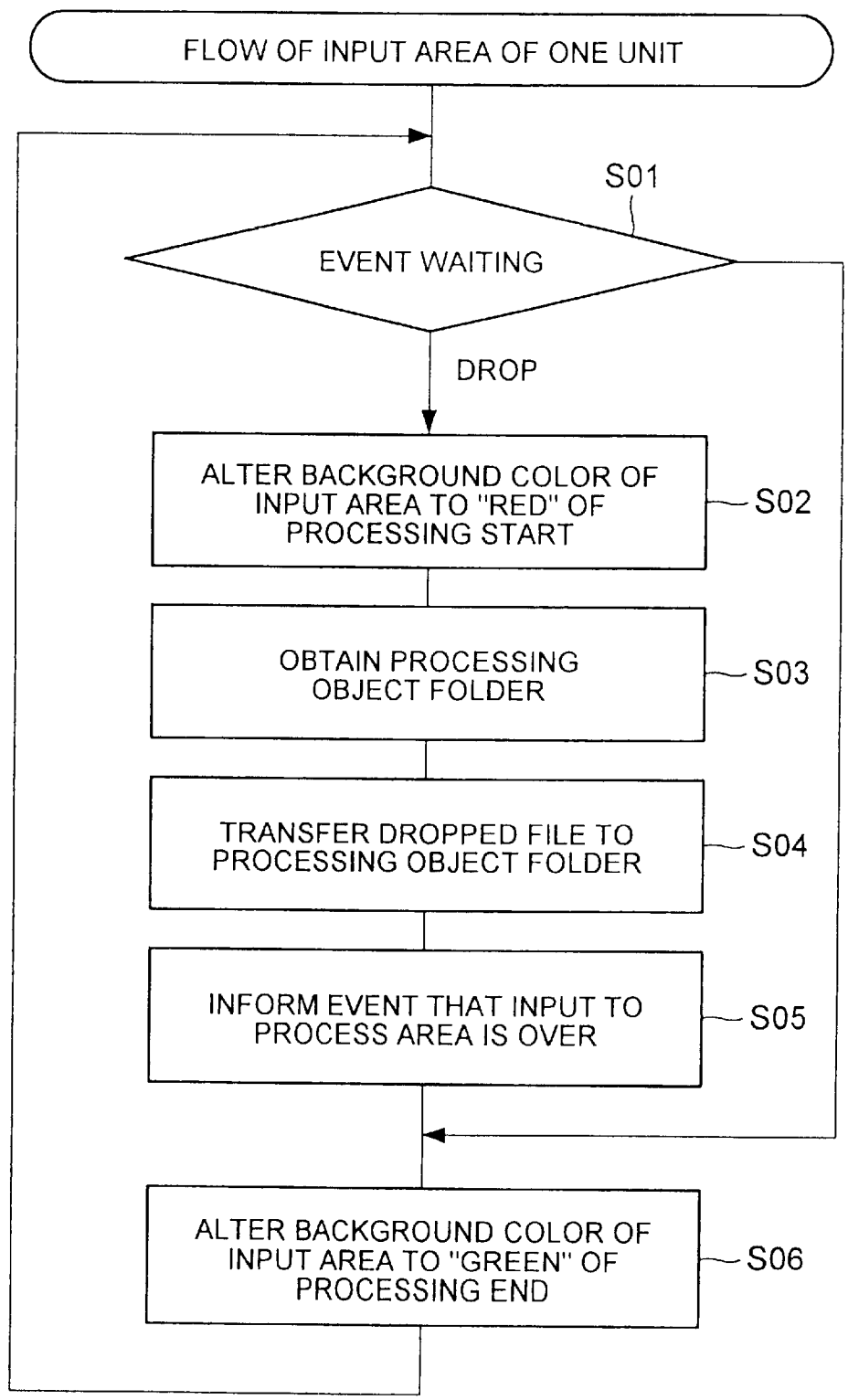
FIG. 16 is a flowchart useful for understanding processing in an input area of the work flow shown in FIG. 15.

FIG. 16 is a flowchart useful for understanding processing in an input area of the work flow shown in FIG. 15.

As shown in FIG. 16, the flowchart starts from a state of an event waiting to the input area 13a of the process display unit 13 (cf. FIG. 15) (a step S01). While no event occurs, the process jumps to a step S06 in which the background color of the input area 13a is altered to the "green" representative of the processing termination, and then the process returns to the step S01 to wait occurrence of the event.

When any one of the file names 61a, 61b, 61c, 61d, . . . displayed in the input file display area 61 is subjected to dragged and dropped to the input area 13a of the process display unit 13 by for example, a mouse operation of a user, the process goes to a step S02 in which the background color of the input area 13a is altered to the "red" representative of the processing start.

The processing procedure execution means 16 of the present embodiment (cf. FIGS. 3 and 4) obtains the processing object folder name (a step S03) and transfers the dropped file to the processing object folder 14 (a step S04). Next, in a step S05, an event that an input to the process area 13b is over is communicated, and the process goes to the step S06.

In the step S06, the background color of the input area 13a is altered to the "green" representative of the processing termination, and the process returns to the step S01.

Figure 17:
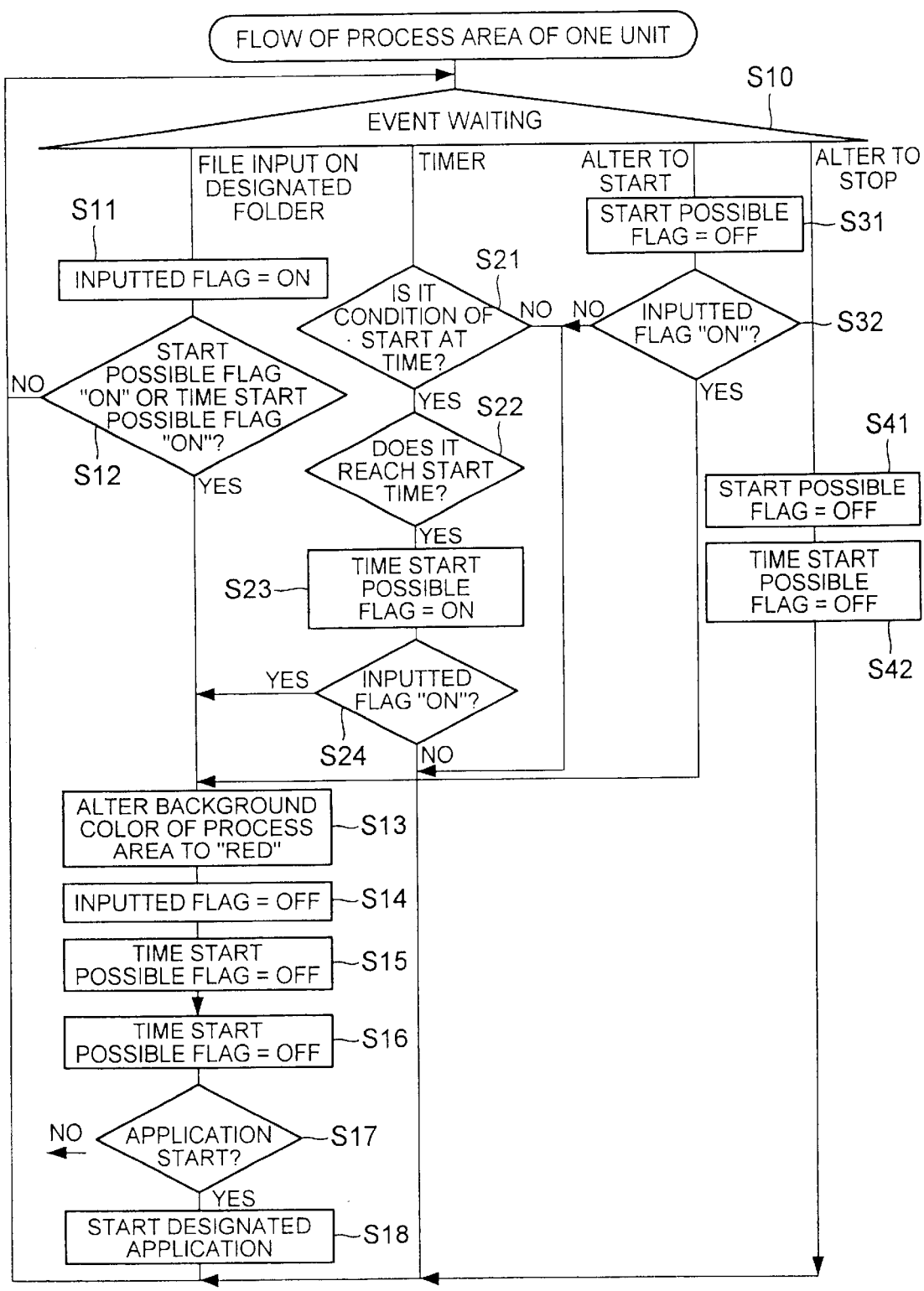
FIG. 17 is a flowchart useful for understanding processing in a process area of the work flow shown in FIG. 15.

FIG. 17 is a flowchart useful for understanding processing in a process area of the work flow shown in FIG. 15.

As shown in FIG. 17, the flowchart starts from a state of an event waiting to the process area 13b of the process display unit 13 (cf. FIG. 15) (a step S10).

In the state of the event waiting in the step S10, when a file input to the processing object folder 14 (cf. FIG. 4) is performed, an "inputted flag" turns on (a step S11). Next, it is determined whether at least one of a "start possible flag" and a "time start possible flag" turns on (a step S12).

As a result of the decision in the step S12, when it is decided that both the two flags do not turn on, the process return to the step S10. On the other hand, when it is decided that at least one of the two flags turns on, the process goes to a step S13.

In the step S13, the background color of the process area 13b is altered to "red" representative of the processing start, and then the "inputted flag" turns off (a step S14), the "time start possible flag" turns off (a step S15), and the "start possible flag" turns off. Next, it is determined whether the condition set up (cf. FIG. 10) to the "start of application" set up area 42b_1 executed by the execution condition set up means 17 shown in FIGS. 3 and 4 is set up to the "start" (a step S17). As a result of decision in the step S17, when it is decided that the condition set up is not set up to the "start", the process returns to the step S10. On the other hand, when it is decided that the condition set up is set up to the "start", the designated application starts (a step S18), and then the process returns to the step S10.

In the state of the event waiting in the step S10, it is determined whether the condition set up to the "processing condition" set up area 42b_2 executed by the execution condition set up means 17 shown in FIGS. 3 and 4 is set up to the "start at time" (a step S21). As a result of decision in the step S21, when it is decided that the condition set up is not set up to the "start at time", the process returns to the step S10. On the other hand, when it is decided that the condition set up is set up to the "start at time", the process goes to a step S22 in which it is determined whether it reaches the start time. As a result of decision in the step S22, when it is decided that it reaches the start time, the process goes to a step S23 in which the "time start possible flag" turns on. And next, it is determined whether the "inputted flag" turns on (a step S24). As a result of decision, when it is decided that the "inputted flag" does not turn on, the process returns to the step S10. On the other hands, when it is decided that the "inputted flag" turns on, the process goes to the step S13.

In the state of the event waiting in the step S10, when the condition set up to the "processing condition" set up area 42b_2 executed by the execution condition set up means 17 shown in FIGS. 3 and 4 is altered to the "start", the "start possible flag" turns on (a step S31), and next, it is determined whether the "inputted flag" turns on (a step S32). As a result of decision in the step S32, when it is decided that the "inputted flag" does not turn on, the process returns to the step S10. On the other hand, when it is decided that the "inputted flag" turns on, the process goes to the step S13.

Further, In the state of the event waiting in the step S10, when the condition set up to the "processing condition" set up area 42b_2 executed by the execution condition set up means 17 shown in FIGS. 3 and 4 is altered to the "stop", the "start possible flag" turns off (a step S41), and the "time start possible flag" turns off, and then the process returns to the step S10.

Figure 18:
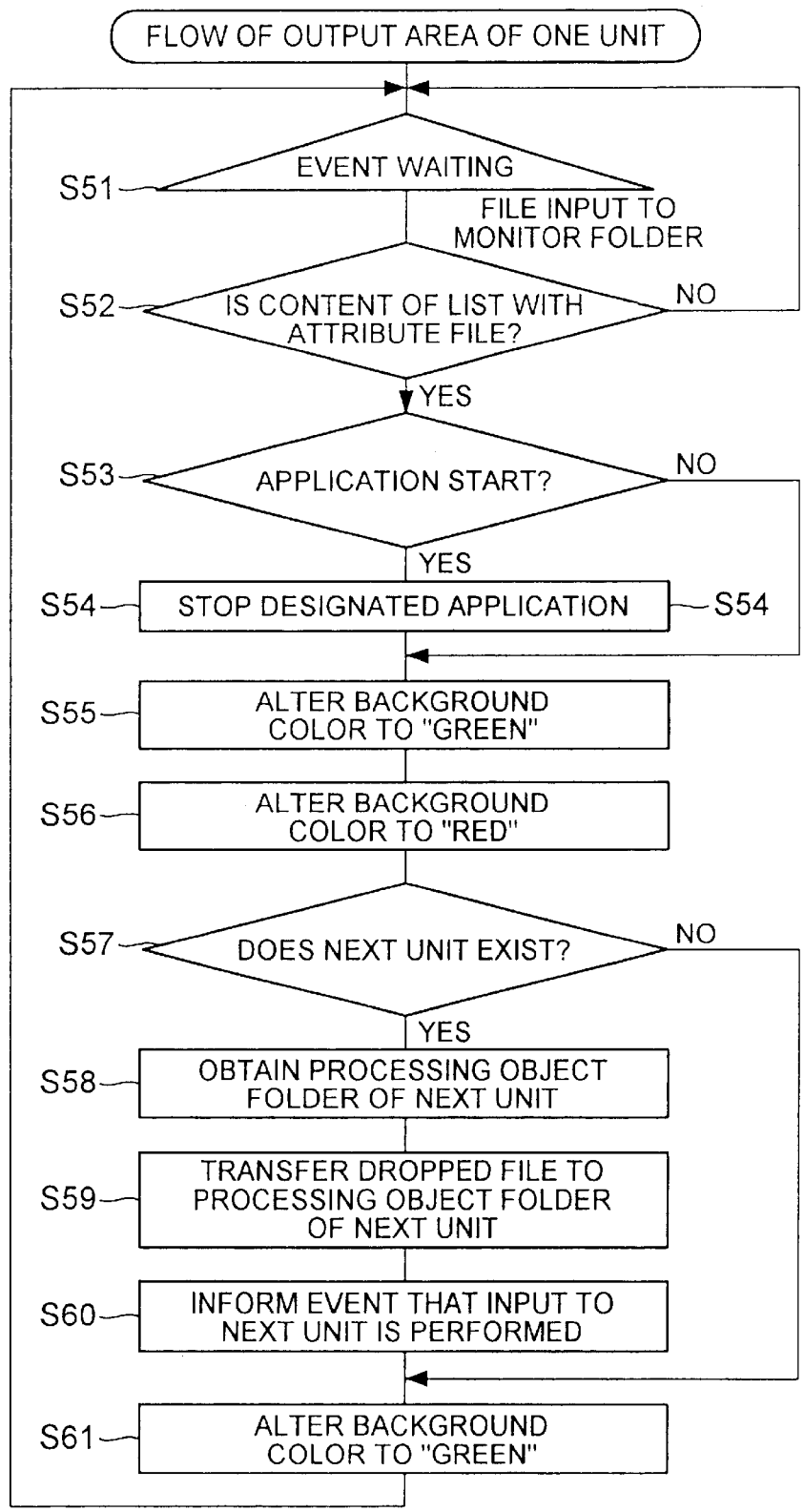
FIG. 18 is a flowchart useful for understanding processing in an output area of the work flow shown in FIG. 15.

FIG. 18 is a flowchart useful for understanding processing in an output area of the work flow shown in FIG. 15.

As shown in FIG. 18, the flowchart starts from a state of an event waiting to the process area 13b of the process display unit 13 (cf. FIG. 15) (a step S51).

In the state of the event waiting in the step S51, when a file input to the processing result folder 15 (cf. FIG. 4) is performed, it is determined whether the attribute list of a file set up on the "attribute list of a file" set up area 42c_2 of the processing result folder dialog 42c executed by the execution condition set up means 17 shown in FIGS. 3 and 4 is coincident with the attribute of a file dropped in the process area 13b (a step S52).

As a result of the decision in the step S52, when it is decided that the attribute list is coincident with the attribute of the file, the process goes to a step S53 in which it is determined whether the condition set up (cf. FIG. 9) to the "start of application" set up area 42b_1 executed by the execution condition set up means 17 shown in FIGS. 3 and 4 is set up to the "start" (a step S53).

As a result of decision in the step S53, when it is decided that the condition set up is not set up to the "start", the process jumps to a step S55. On the other hand, when it is decided that the condition set up is set up to the "start", the designated application stops (a step S54).

In a step S55, the background color of the process area 13b is altered to the "green" representative of the processing termination (a step S55), and the background color of the output area 13c is altered to the "red" representative of the processing start (a step S56), and thereafter, it is determined whether the subsequent process display unit is present or absent (a step S57).

As a result of a decision in the step S57, when the subsequent process display unit is absent, the process jumps to a step S61. On the other hand, when the subsequent process display unit is present, the process goes to a step S58 in which the processing object folder name set up on the processing object folder 14 (cf. FIG. 4) of the subsequent process display unit is obtained. A file dropped to the processing object folder 14 is transferred to the processing object folder 14 of the subsequent process display unit (a step S59). Next, the event that a file is inputted to the subsequent process display unit is informed, and then the process goes to a step S61.

In the step S61, the background color of the output area 13c is altered to the "green", and then the process returns to the step S51.

As mentioned above, according to a process control system of the present invention, there is provided work flow display means for displaying on a display screen a work flow in which a plurality of process display units each represented by a diagram consisting of a process area representative of a process, an input area representative of a processing object in the process and an output area representative of a processing result in the process, is coupled over a plurality of stages in a sequence that a work is formed. This feature makes it possible for a worker of a process control to perform a work while looking at a flow in its entirety, and thereby implementing a process control system with a high operability. Further, according to the present invention, processing procedures of the respective processes can be set up in form of a complete automatic processing, a half automatic processing, and a manual processing, and thus it is possible to implement a process control system capable of expecting a use fertile in flexibility.

Further, according to a process control program storage medium of the present invention, it is possible to readily construct the above-mentioned process control system on the computer system.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A process control system for controlling processes, comprising:

work flow display means for displaying on a screen a work flow in which a plurality of processes constituting a work is represented in form of a diagram, wherein said work flow display means displays on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed.

2. A process control system according to claim 1, wherein at least one process of a plurality of processes represented by a plurality of process display units constituting the work flow displayed on the screen is an automatic processing process in which a processing procedure according to the process is executed taking as a processing object a file in a processing object folder associated with the process, and processing procedure execution means for creating a file representative of a processing result is associated with a processing result folder associated with the process, and said process control system further comprises first file transfer means for transferring a file represented by a desired one of file display units, each of which is a display unit representative of a file, to a processing object folder in which the file represented by the desired file display unit is associated with an automatic processing process on the work flow, in accordance with an operation in which the desired file display unit is associated with an input area of a process display unit representative of the automatic processing process.

3. A process control system according to claim 2, wherein said processing procedure execution means includes execution condition set up means for setting up conditions related to execution of the processing procedure when the processing procedure is executed.

4. A process control system according to claim 2, wherein said process control system further comprises second file transfer means for transferring a file formed on a processing result folder associated with a preceding process of an automatic processing process constituting the work to a processing object folder of a subsequent automatic processing process.

5. A process control system according to claim 4, wherein said preceding process is also the automatic processing process, and said second file transfer means is arranged in such a manner that when a file representative of a processing result is created in a processing result folder associated with said preceding process by execution of the process procedure by the processing procedure execution means associated with the preceding process, the file is transferred to the processing object folder associated with the subsequent automatic processing process.

6. A process control system according to claim 4, wherein said second file transfer means transfers the file represented by a desired file display unit to the processing object folder associated with the subsequent automatic processing process in accordance with an operation for associating the desired file display unit with an output area of a process display unit representative of the preceding process, using a handler.

7. A process control system according to claim 1, wherein said work flow display means includes progress state display means for partially altering a display form of the work flow to display on the screen a state of progress of the work represented by the work flow.

8. A process control program storage medium storing a process control program which causes a computer system to operate as a process control system for controlling processes, said process control system including work flow display means for displaying on a screen a work flow in which a plurality of processes constituting a work is represented in form of a diagram, wherein said process control program has said work flow display means for displaying on the screen the work flow in which a plurality of process display units each represented by the diagram consisting of a process area representative of a process, an input area representative of a processing object in the process and an output area representative of a processing result in the process, is coupled over a plurality of stages in a sequence that a work is formed.

* * * * *